No. 608,652. Patented Aug. 9, 1898.
A. M. VILLON, Dec'd.
F. R. COUDERT, Jr., Administrator.
PROCESS OF MANUFACTURING ETHYLIC ALCOHOL.
(Application filed Mar. 11, 1897.)
(No Model.)
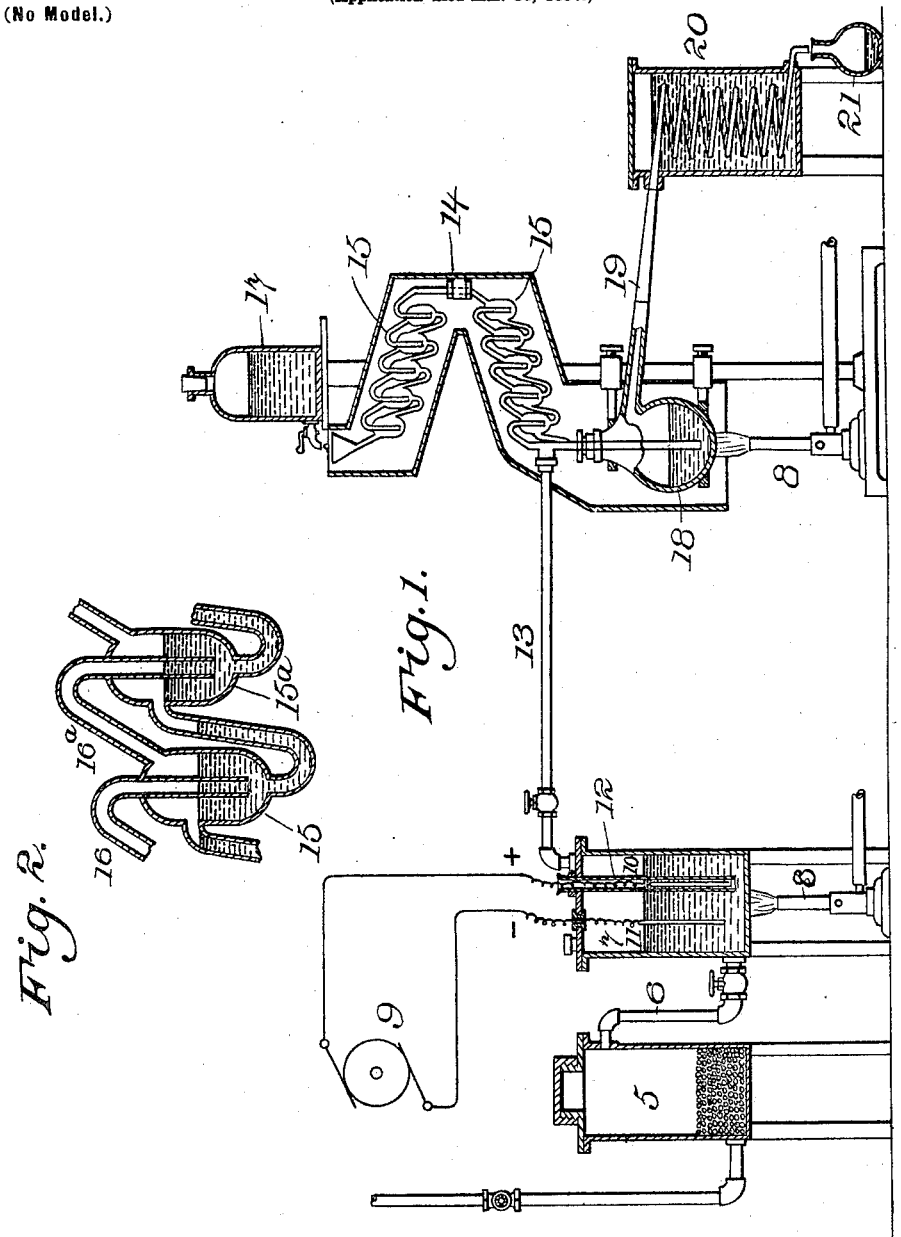

UNITED STATES PATENT OFFICE.

FREDERIC R. COUDERT, JR., OF NEW YORK, N. Y., ADMINISTRATOR OF AIME MATHIEU VILLON, DECEASED.

PROCESS OF MANUFACTURING ETHYLIC ALCOHOL.

SPECIFICATION forming part of Letters Patent No. 608,652, dated August 9, 1898.

Application filed March 11, 1897. Serial No. 626,987. (No specimens.)

*To all whom it may concern:*

Be it known that I, FREDERIC R. COUDERT, Jr., of the city of New York, in the State of New York, administrator of the estate of AIME MATHIEU VILLON, deceased, late a resident of Lyons, France, do declare the said AIME MATHIEU VILLON to have invented a new Process of Manufacturing Ethylic Alcohol, of which the following is a specification.

The invention for which it is desired to secure Letters Patent consists in a process for manufacturing ethylic alcohol, which was described by the said AIME MATHIEU VILLON in an article entitled "L'Alcool Artificiel," published in *La Nature*, Paris, June 15, 1895, and which process consists, essentially, in subjecting acetylene gas derived from the decomposition of calcium carbid by water to the action of a reducing agent of the character which will absorb the acetylene and convert it into ethylene, and which agent is not consumed, but may be regenerated by the action of nascent hydrogen, and which is therefore capable of producing an indefinite quantity of ethylene from acetylene.

The process further contemplates the reduction or regeneration of the reducing agent by the action of nascent hydrogen generated by electricity.

The object of the invention is to produce a very pure quality of alcohol at very low cost.

To carry the invention into effect, use may be made of the apparatus shown in the accompanying drawings and in the manner which will now be described.

In the drawings, Figure 1 is a diagrammatic view, partially in elevation and partially in vertical section, showing the general construction and relation of the several parts of the apparatus. Fig. 2 is an enlarged vertical section of a portion of the absorption apparatus.

The successive steps which should be taken and the general principles involved in carrying out the process are as follows: There is first introduced into a suitable vessel 5 a definite quantity of calcium carbid ($CaC_2$)—for instance, one ton, (two thousand pounds.) To this is added sufficient water to decompose it to form calcium oxid and acetylene gas, ($CaO + C_2H_2$.) From one ton of calcium carbid there will be developed about four hundred kilograms of acetylene gas. The acetylene gas ($C_2H_2$) so formed is transmitted through the pipe 6 and brought into contact with—*i. e.*, absorbed by—a solution of a reducing-salt contained within the vessel 7—such, for instance, as a double salt of ammonium and chromo sulfates of the protoxid type, as indicated by the formula $CrO$.

Chromous sulfate is known only in solution, and it is well known that the ammoniacal solution of this salt absorbs oxygen, nitric oxid, and acetylene.

The formula $(NH_4)_2SO_4 + CrSO_4 + aqua$ is based by analogy upon the formula $K_2SO_4 + CrSO_4 + 6H_2O$; but it is also possible that the formula is $(NH_4)_2SO_4 + 2CrSO_4 + aqua$.

The strength of the solution should be sufficient to yield hydrogen by weight equal approximately to ten per cent. of the acetylene gas used—*i. e.*, for four hundred kilograms of acetylene gas there should be generated forty kilograms of hydrogen. The result of this action is the formation of ethylene gas ($C_2H_4$) and the oxidation of the reducing agent to form a compound of the oxid type, as indicated by the formula $Cr_2O_3$. The nascent hydrogen required to transform the $C_2H_2$ into $C_2H_4$ is thus obtained on the assumption that the formula of the solution of chromium and ammonium sulfate is as follows:

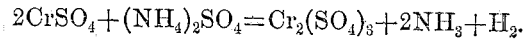

$$2CrSO_4 + (NH_4)_2SO_4 = Cr_2(SO_4)_3 + 2NH_3 + H_2.$$

The amount of the solution of ammonium and chromium sulfates required to convert four hundred kilograms of acetylene into four hundred and thirty kilograms of ethylene is approximately 11.216 kilograms. In practice it is preferable to heat the solution of the reducing-salt to approximately 40° centigrade, which may be accomplished by means of the burner 8 or other suitable form of heat. The heating of the solution is not essential. The increase of temperature merely adds to the rapidity with which the process takes place.

The oxidized reducing-salt may be readily reduced to its former state by submitting it to the action of nascent hydrogen, which may be conveniently produced by any suitable electrolytic apparatus—such, for instance, as that shown in Fig. 1, and which consists of the dynamo 9 and electrodes 10 and 11. These electrodes are inclosed within the vessel 7 and immersed in the solution contained within the vessel. The positive electrode 10 is inclosed in the tube 12, open at the bottom and at the top, which communicates with the atmosphere, the object of this arrangement being to permit the oxygen gas set free by this electrode to escape into the atmosphere.

The hydrogen which is generated at the negative electrode is set free directly in contact with the solution of the reducing agent and, as the hydrogen is nascent, acts to reduce the oxidized solution to its original condition, probably according to the equation

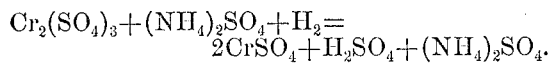

$$Cr_2(SO_4)_3 + (NH_4)_2SO_4 + H_2 = \\ 2CrSO_4 + H_2SO_4 + (NH_4)_2SO_4.$$

It will be observed that it is not necessary to make use of the large quantity of the reducing-salt mentioned, (11.216 kilograms,) as a definite quantity (its amount depending upon whether the reducing-salt is acted upon constantly or at intervals) will be capable of producing an indefinite quantity of ethylene from acetylene.

The nascent hydrogen necessary to reduce the salt may be produced by well-known chemical means—for instance, as described in the article in *La Nature*, by the action of dilute sulfuric acid on iron or zinc.

Instead of using the particular salt mentioned any other suitable reducing agent of the character which will transform the acetylene into ethylene and be itself regenerated without appreciable loss of weight may be used. In other words, the essential requirements of the reducing agent are that its chemical affinity for acetylene will be such as to transform the acetylene into ethylene and at the same time itself be capable of being reduced without appreciable loss to its original state when subjected to the action of nascent hydrogen. The ethylene gas which is produced is slightly heavier than the acetylene gas. Four hundred kilograms of acetylene gas will produce about four hundred and thirty kilograms of ethylene gas.

The ethylene gas produced as above described is transmitted by the tube 13 to the absorption apparatus 14. Any suitable absorption apparatus may be employed. That shown at 14 consists of a series of cells 15, arranged in progressive order downward, and a series of pipes 16, dipping into the cells and arranged in progressive order upward. These cells are adapted to be filled with sulfuric acid from a suitable receptacle 17. The ethylene passing through the pipe 13 reaches the pipe 16, thence through the sulfuric acid, cell 15, thence through the pipe $16^a$ to cell $15^a$, and so on through the series, the gas being fully absorbed before reaching the top of the series of cells. Preferably the sulfuric acid is heated to about 85° centigrade. (For four hundred and thirty kilograms of ethylene there will be required about fourteen hundred kilograms of concentrated sulfuric acid.) By this combination of ethylene and sulfuric acid there is formed hydrogen-ethyl sulfate, which gradually works its way downward into the retort 18. To the solution of hydrogen-ethyl sulfate in the retort 18 there is added about thirty-three per cent. of water, which is then raised to the boiling-point by means of a burner 8 or other suitable heating apparatus. As the solution in the retort is raised to the boiling-point ethylic alcohol passes off as a gas through the tube 19 and is condensed in the vessel 20, (any suitable condenser will serve the purpose,) and finally passes into the vessel 21 as chemically-pure ethylene alcohol. This completes the process.

It will be understood from the foregoing that the particular apparatus shown and described is in no wise essential, as any suitable apparatus known to chemists may be employed. Neither is it essential that the process be carried out by acting at intervals upon the reducing-salt by nascent hydrogen, as it is evident that the acetylene gas may be continuously discharged into the reducing solution and this solution continuously acted upon by the nascent hydrogen set free by the action of the electric current traversing the solution.

The process above described may be indicated by the following formulæ:

1. $CaC_2 + 2H_2O = Ca(OH)_2 + C_2H_2$.
2. $C_2H_2 + H_2 = C_2H_4$.
3. $C_2H_4 + H_2SO_4 = C_2H_6SO_4$.
4. $C_2H_6SO_4 + H_2O = H_2SO_4 + C_2H_5OH$.

It will be observed from the above formulæ that the only materials consumed are water, calcium carbid, and hydrogen. The reducing or converting agent is, as previously explained, transformed from the state of sesquioxid to its original state (protoxid) by nascent hydrogen generated chemically or by electrolytic action, which latter requires but a small exhibition of mechanical energy.

The sulfuric acid, after the ethylic alcohol has been separated from it, is in a condition to be used again. Thus by the improved process described an ethylic alcohol is produced which is chemically pure and not accompanied by other alcohols, fusel-oils, ethers, &c., poisonous in character, or by other products of fermentation, as is the case with alcohol as commonly produced. Further, the commercial cost of producing the alcohol, owing to the low cost of calcium carbid, is much smaller than by any process heretofore known. In practice it has been found that the cost of the alcohol produced is very little in excess of that of the calcium carbid consumed.

It should be understood that the invention is not limited to the employment of the particular chemical specified as the agent for converting or transforming (these terms are used as synonymous) the acetylene into ethylene gas. The materials, however, which have been mentioned are those which are considered best adapted to accomplish the results stated. In chemistry there are other chemicals which have a similar reducing power and are readily regenerated by nascent hydrogen without appreciable loss of weight, and while all these various chemicals have not been mentioned in the specification, they being known to chemists, they are all considered as equivalents, and claim is broadly made to all such as being within the intent of the invention; and, further, it is believed that the said AIME MATHIEU VILLON was the first to produce ethylic alcohol by subjecting acetylene derived from calcium carbid to the action of an agent which will convert acetylene into ethylene and be itself regenerated without appreciable loss of weight by nascent hydrogen.

Having thus described the invention, what is claimed is—

1. A step in the process for manufacturing ethylic alcohol, which consists in subjecting acetylene to the action of an agent of the character, which will transform acetylene into ethylene and be itself regenerated by the action of nascent hydrogen.

2. A step in the process for manufacturing ethylic alcohol, which consists in subjecting the reducing agent employed to transform acetylene into ethylene, to the action of nascent hydrogen.

3. A process for manufacturing alcohol, which consists in subjecting acetylene to the action of a reducing agent of the character which will transform acetylene into ethylene and be itself regenerated by the action of nascent hydrogen, absorbing the ethylene by sulfuric acid, and finally subjecting a solution of water and hydrogen-ethyl sulfate to the temperature necessary to effect production and distillation of ethyl alcohol.

4. A continuous process for manufacturing ethylic alcohol, which consists of the following steps: first, subjecting acetylene to the action of a reducing agent of the character described; second, absorbing the evolved ethylene by sulfuric acid; third, adding water to the solution of hydrogen-ethyl sulfate thus formed; fourth, subjecting said solution to the action of a sufficient heat to effect the production and distillation of ethyl alcohol; fifth, subjecting the reducing agent to the action of nascent hydrogen.

5. The herein-described process for manufacturing ethylic alcohol, which consists in decomposing calcium carbid by water to form acetylene, then subjecting acetylene to the action of a reducing agent of the character which will reduce acetylene to ethylene and be itself regenerated by the action of nascent hydrogen, then absorbing the ethylene by sulfuric acid, and finally subjecting a solution of water and hydrogen-ethyl sulfate to the temperature necessary to effect distillation of the alcohol.

6. The herein-described process of manufacturing ethylic alcohol, which consists in decomposing calcium carbid by water to form acetylene, then subjecting the acetylene to the action of a double salt of ammonium and chromium sulfates, to form ethylene, then absorbing the ethylene by sulfuric acid, then subjecting the solution of water and hydrogen-ethyl sulfate to the temperature necessary to effect distillation of the alcohol, and finally either intermittingly or continuously subjecting the solution of the reducing agent to the action of an electric current.

In testimony whereof I, the aforesaid administrator of the estate of AIME MATHIEU VILLON, deceased, do hereby subscribe my name, in the presence of two witnesses, this 9th day of March, 1897.

FREDERIC R. COUDERT, JR.,
*Administrator of the estate of Aime Mathieu Villon, deceased.*

Witnesses:
   H. E. ELLIS,
   CHARLES A. CONLON.